(12) United States Patent
Stefan et al.

(10) Patent No.: US 6,567,741 B1
(45) Date of Patent: May 20, 2003

(54) METHOD AND SYSTEM FOR REDUCING SHAPE POINTS FOR A NAVIGATION SYSTEM

(75) Inventors: Jeffrey M. Stefan, Clawson, MI (US); Richard J. Kacel, Waterford, MI (US); Daniel N. Aloi, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 12 days.

(21) Appl. No.: 10/002,323

(22) Filed: Nov. 1, 2001

(51) Int. Cl.$^7$ .................. G01C 21/26; G01C 21/28; G01C 21/34
(52) U.S. Cl. ............. 701/206; 701/200; 701/207; 701/209; 340/988; 340/989; 340/991–994; 342/357.01; 342/357.06; 342/357.08; 342/357.12
(58) Field of Search ................. 701/200–203, 701/205–215; 340/988, 989, 991–994; 707/100; 342/357.01, 357.06, 357.08, 357.12

(56) References Cited

U.S. PATENT DOCUMENTS

| | | | | |
|---|---|---|---|---|
| 5,828,571 A | * | 10/1998 | Bessacini et al. | 701/23 |
| 6,029,111 A | * | 2/2000 | Croyle | 701/207 |
| 6,281,807 B1 | * | 8/2001 | Kynast et al. | 340/905 |
| 6,330,858 B1 | * | 12/2001 | McDonough et al. | 101/208 |
| 6,366,851 B1 | * | 4/2002 | Chojnacki et al. | 701/208 |
| 6,366,927 B1 | * | 4/2002 | Meek et al. | 707/104.1 |
| 2002/0062193 A1 | * | 5/2002 | Lin | 701/208 |
| 2002/0087262 A1 | * | 7/2002 | Bullock et al. | 701/202 |
| 2002/0161513 A1 | * | 10/2002 | Bechtolsheim et al. | 701/208 |

\* cited by examiner

*Primary Examiner*—Thomas G. Black
*Assistant Examiner*—Ronnie Mancho
(74) *Attorney, Agent, or Firm*—Anthony Luke Simon

(57) ABSTRACT

The present invention provides a system, a method and a computer usable medium including a program for generating navigation instructions for a vehicle. This may be done by determining a number of shape points between a set of primary maneuver points and determining whether the number of shape points exceeds a cardinal threshold; determining a great circle distance and a bearing between a first shape point and a second shape point, determining whether the bearing exceeds an angular threshold and eliminating the second shape point if it is determined that the bearing exceeds the angular threshold.

18 Claims, 4 Drawing Sheets

100

200

300

400

METHOD AND SYSTEM FOR REDUCING SHAPE POINTS FOR A NAVIGATION SYSTEM

FIELD OF THE INVENTION

This invention relates generally to the navigation of a moving vehicle. In particular, this invention relates to a method and system for decreasing the number of shape points to increase effectiveness and response time of a server-based navigation system.

BACKGROUND OF THE INVENTION

Onboard vehicle navigation technology has come a long way in the recent years. Existing computer capabilities coupled with wireless and Global Positioning Satellite technology is making huge advances in taking some of the high cost out of "real time" vehicle navigation. There are different systems to make this technology work (for example, onboard autonomous systems vs. server-based navigation systems). There are also a number of different methods to support this technology. On server-based navigation systems, the client is placed onboard the vehicle while the server, communicated with through wireless and often satellite technology, plays host to most of the source applications and databases.

Within onboard vehicle navigation systems, there is a predetermined list of location points where a vehicle is instructed to proceed in a certain direction (i.e., turn right, turn left, etc.) This list is known as a maneuver list and the points on this list are known as maneuver points. The maneuver list is processed from a server based database to a client processor onboard the vehicle. Within each maneuver point are geodesic points (hereafter known as shape points). Each shape point has a latitudinal and longitudinal value identifying its location with respect to its physical location on the surface of the earth. The number of shape points and the position of shape points, determines the geographic condition of the path being navigated (e.g., curvy line vs. straight line).

The processing of this information is necessary to determine vehicle location and to generate correct navigation instructions. The server based processing for this is time consuming and this processing time is dependent on the amount of data input into the server. Navigation instructions must be generated and transmitted to the vehicle in a timely fashion to provide a useful navigation system. For example, if a vehicle has passed a maneuver point on a route it will need instructions on the next maneuver at an acceptable time before it reaches or exceeds that next maneuver point. Receiving maneuver information after passing the maneuver point is useless and compromises the need for the navigation system.

The number of shape points to be processed has a direct correlation to the amount of processing time and the amount of physical processor based memory needed for the navigation system to operate effectively and generate timely and accurate instructions. Navigating on extremely curvy routes, which require numerous shape points, could potentially warrant the design and installation of onboard vehicle navigation systems that are cost prohibitive.

It would be desirable, therefore, to provide a method to reduce shape points to provide more effective and timely navigation instructions to a moving vehicle that overcomes the above.

SUMMARY OF THE INVENTION

One aspect of the present invention provides a method for generating navigation instructions for a vehicle. A number of shape points between a set of primary maneuver points may be determined. A determination may be made as to whether the number of shape points exceeds a cardinal threshold. A bearing between a first shape point and a second shape point may be determined if the number of shape points exceeds the cardinal threshold. It may be determined whether the bearing exceeds an angular threshold. The second shape point may be eliminated if associated bearings exceed the angular threshold. In one embodiment, the angular threshold may be predetermined. In still another embodiment, the cardinal threshold may be predetermined.

Another aspect of the present invention provides a system for generating navigation instructions for a vehicle. The system may include means for determining a number of shape points between a set of primary maneuver points, means for determining whether the number of shape points exceeds a cardinal threshold and means for determining a bearing between a first shape point and a second shape point, if it is determined that the number of shape points exceeds the cardinal threshold. It may also include means for determining whether the bearing exceeds an angular threshold and means for eliminating the second shape point if it is determined that associated bearings exceed the angular threshold.

Another aspect of the system provides a computer usable medium including a program for generating navigation instructions for a vehicle. The program may include computer readable program code that determines a number of shape points between a set of primary maneuver points and computer readable program code that determines whether the number of shape points exceeds a cardinal threshold. It may also include computer readable program code that determines a great circle distance and a bearing between a first shape point and a second shape point, if it is determined that the number of shape points exceeds the cardinal threshold. The program may also include computer readable program code that determines whether the bearing exceeds an angular threshold and computer readable program code that eliminates the second shape point if it is determined that the bearing exceeds the angular threshold.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
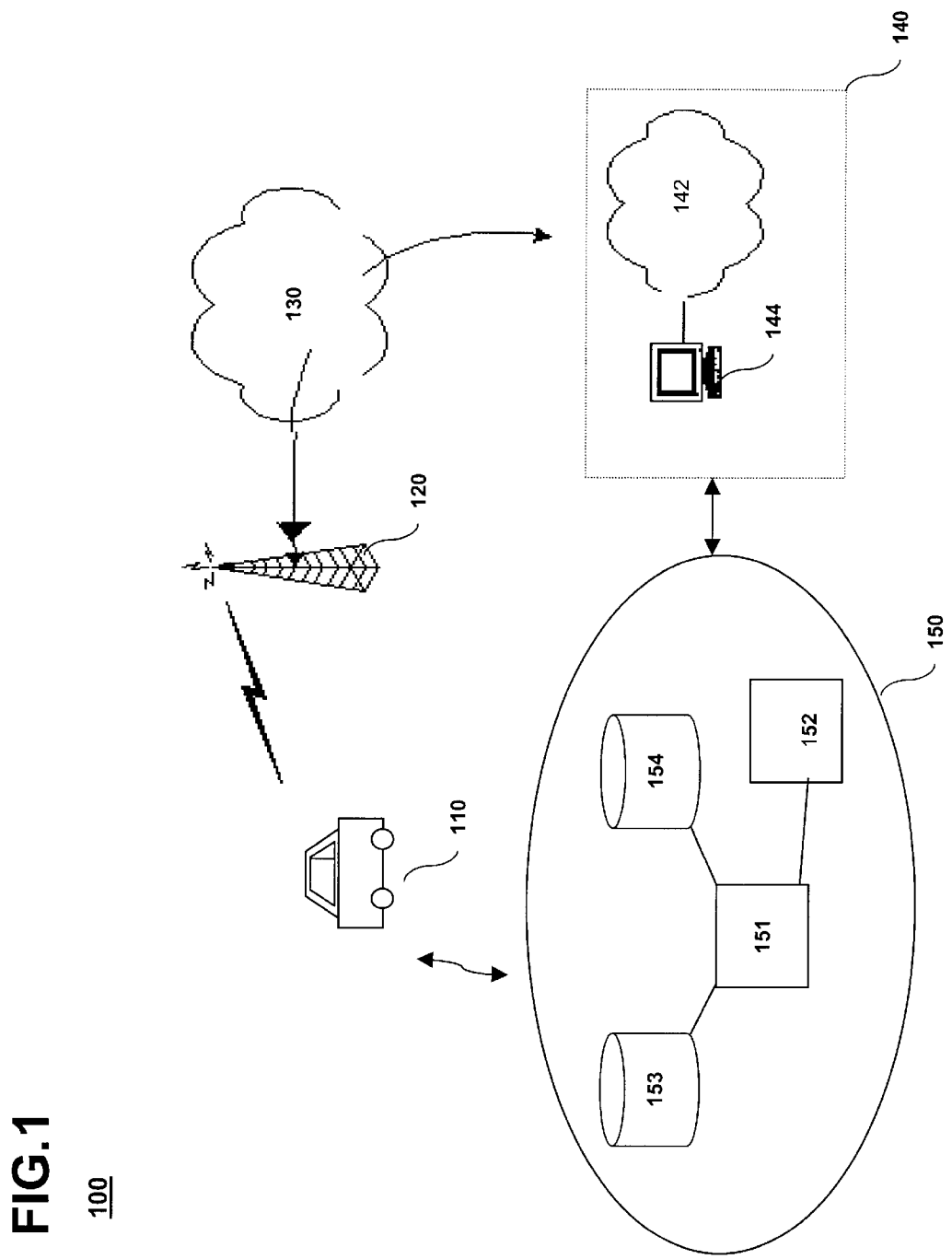
FIG. 1 is a schematic diagram of one embodiment of a system for generating navigation information for a vehicle in accordance with the present invention.

FIG. 1 shows one embodiment of a system for providing services to a vehicle in accordance with the present invention at 100. The system may include one or more vehicle clients. 110, one or more carrier systems 120, one or more communication networks 130, one or more service management subsystems 140, and one or more navigation subsystems 150. The service management subsystems may include one or more service management applications 142 and one or more service managers 144. The navigation subsystems 150 may include one or more route applications 151, 152 and one or more coordinate databases 153, 154.

Navigation subsystem 150 is a system for generating routes to be delivered to vehicle client 110 and for receiving route information from vehicle client 110. Navigation subsystem 150 may be connected with or in communication with service management subsystem 140. Service management subsystem 140 may be used to manage the delivery of information to or from navigation subsystem 150 to other parts of system 100. Routes may be delivered or information may be received via a live agent, such as a human advisor, or via a virtual agent, such as an interactive computer program.

Navigation subsystem 150 may be any suitable hardware or software configuration, or combination of hardware and software that is configured to generate a route, process route information or receive information from vehicle client 110. In one embodiment of the invention, navigation subsystem 150 includes one or more route applications 151, 152 and one or more coordinate databases 153, 154. For example, route applications 151, 152 may be any suitable software application for generating route information or otherwise processing route information. Coordinate databases 153, 154 may be any suitable databases for storing route information, such as location coordinates.

Vehicle client 110 may be any suitable vehicle. For example, the vehicle may be an automobile or a passenger-carrying unit such as a bus or train. Alternatively, vehicle client 110 may be an occupant of the vehicle or any suitable client device contained in the vehicle. In one embodiment of the invention, vehicle client 110 is a mobile or portable device equipped to communicate with service management subsystem 140. Carrier system 120 is any suitable system for transmitting a signal from vehicle 110 to service management subsystem 140. Carrier system 120 may also transmit a signal from service management subsystem 140 to vehicle client 110. In one embodiment of the invention, carrier system 120 is a wireless carrier system as is well known in the art. Carrier system 120 may be, for example, a transmitter/receiver unit attached to vehicle client 110. Alternatively, carrier system 120 may be a separate transmitter/receiver carried by vehicle client 110.

Communication network 130 is any suitable system for communicating between vehicle client 110 and service management subsystem 140. In one embodiment of the invention, communication network is a public switched telephone network (PSTN). Alternatively, communication network 130 may be a multiprotocol Internet or intranet capable of transmitting voice and/or data in either analog or digital form or a combination of both. Alternatively, communication network 130 may be a hybrid communication network or virtual network.

Service management subsystem 140 is a system for managing a variety of services to be delivered to or from vehicle client 110. In one embodiment of the invention, service management subsystem 140 manages services that can be distributed over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered. Service management subsystem 140 may maintain a consistent subscriber experience and "look and feel" across the products being delivered across the service distribution channels enabled.

Figure 2:
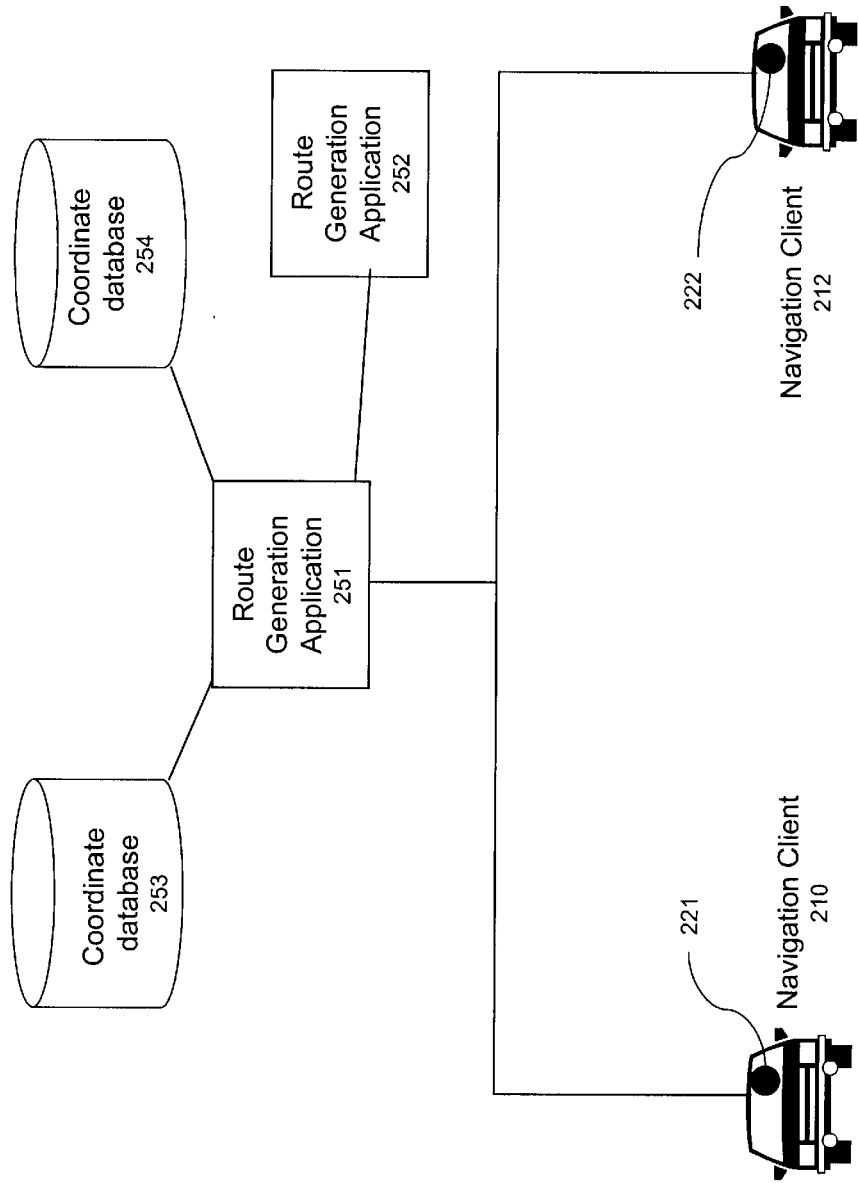
FIG. 2 is a schematic diagram of another embodiment of a system for generating navigation information for a vehicle in accordance with the present invention.

FIG. 2 shows one embodiment of a navigation system in accordance with the present invention at 200. Navigation system 200 may include one or more navigation clients 210, 212. Each navigation client 210, 212 may have an in-vehicle navigator 221, 222. Navigation system 200 may also include one or more route generation applications 251, 252. Navigation system 200 may also include one or more coordinate databases 253, 254.

Navigation clients 210, 212 may be one or more vehicle clients as described above.

In-vehicle navigator 221, 222 may be any suitable component of navigation client 210, 212 which may be used to navigate vehicle client 210, 212. For example, in-vehicle navigator 221, 222 may be a driver. Alternatively, in-vehicle navigator 221, 222 may be an automatic system for navigating vehicle 210, 212.

Route generation applications 251, 252 may be any suitable application for calculating maneuver lists of directions between one or more locations. For example, route generation applications 251, 252 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 251, 252 are in communication with coordinate databases 253, 254.

Route generation applications 251, 252 may generate navigation information in any suitable manner. For example, route generation applications 251, 252 may generate routes using geocoding. That is, the application 251, 252 determines a corresponding latitude and longitude based on an input navigation address. Alternatively, route generation applications 251, 252 may generate routes using reverse geocoding. That is, the application 251, 252 determines a corresponding navigation address based on input latitude and longitude coordinates.

Coordinate databases 253, 254 may be any suitable databases for storing such location coordinates as latitude and longitude of a variety of locations. These locations may be, for example, points of interest. Coordinate databases 253, 254 may also be a database of street addresses. Coordinate databases 253, 254 may also be a database of routes between points.

Figure 3:
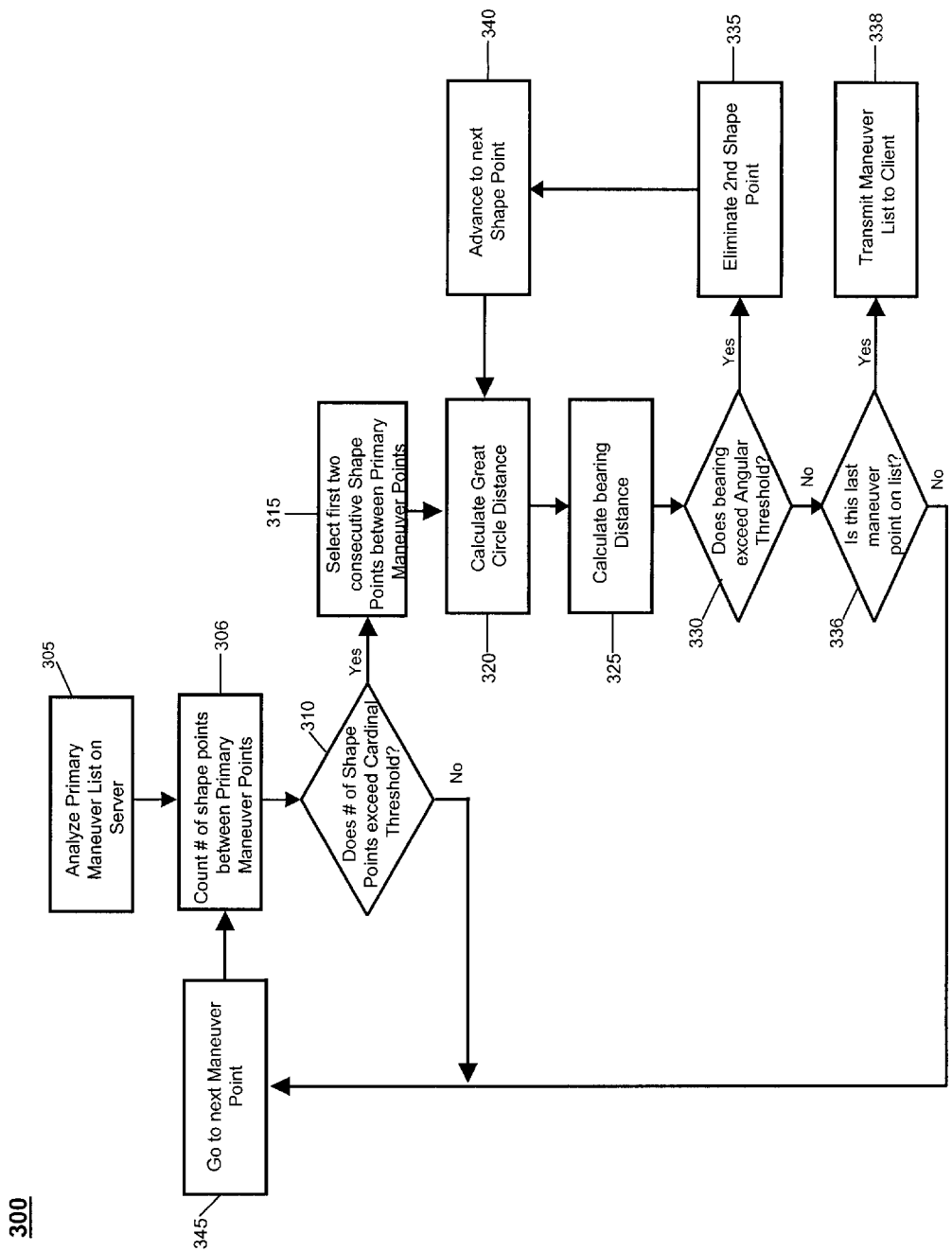
FIG. 3 is a flow diagram of one embodiment of a method for reducing the number of shape points for generating navigation information for a vehicle in accordance with the present invention.

FIG. 3 shows a flow diagram of one embodiment of a method for generating navigation information in accordance with the present invention at 300.

In operation, communication is established with the Navigation subsystem 150 by a call from the navigation client 110. This call may be a request for navigation information or may include transmission of the coordinates of the vehicle. Communication between the navigation subsystem 150 and the vehicle client 110 is continuous throughout the navigation of the vehicle. The vehicle client sends constant updates of vehicle location information to the navigation subsystem 150. The route generation application 151, 152 generates a maneuver list to be eventually downloaded to the vehicle client 110. The maneuver list includes maneuver points, and shape points that identify the longitudinal and latitudinal values of a point on a route and the geography of the space in between two consecutive points (i.e., curvy vs. straight, etc) on a route.

The route generation application housed on the navigation subsystem 150 analyzes the maneuver list (block 305). This may done by identifying a first maneuver point on the maneuver list and a second maneuver point on the maneuver list. The route generation application may then count the number of shape points between the first maneuver point and a second maneuver point on a route (block 306).

On the route navigation subsystem 150 server, a cardinal threshold and an angular threshold are determined (not shown) by route generation application 150, 151. In one embodiment, the cardinal threshold may represent the upper limit of shape points that may exist between maneuver points. The angular threshold may represent the upper limit angle that the client can tolerate and still effectively navigate. In one embodiment, the cardinal and angular threshold values may be based on one or more variables including, for example, user profile, server capacity, type of vehicle, route geographical conditions and the ability of the vehicle to navigate aound a curve at a certain speed. The cardinal and angular threshold values may be predetermined or dynamically calculated.

A determination may then be made on whether the number of shape points that exist between the first maneuver point and the second maneuver point on a route, exceeds the cardinal threshold number (block 310). If it does not exceed the cardinal threshold, then the vehicle client may be considered to be navigating on a path between the first maneuver point and the second maneuver point that has limited geographic variance, and the next consecutive maneuver point on the maneuver list may be analyzed (block 345).

If the number of shape points to be navigated by a vehicle with onboard client 110 between two consecutive maneuver points does exceed the cardinal threshold, the first two consecutive shape points may be selected for analysis (block 315).

In one embodiment, a great circle distance may be calculated by a method that is known in the art between the first shape point and the second consecutive shape point selected for analysis (block 320).

The angular bearing may be calculated by a method that is known in the art between the first shape point and the second consecutive shape point selected for analysis (block 325). In one embodiment, the great circle distance may be used in determining the angular bearing.

A determination may be made as to whether the calculated angular bearing between a first maneuver point and a second shape point on a maneuver list exceeds a predetermined angular threshold value (block 330). If the angular bearing does not exceed the angular threshold then it is determined if the current maneuver point is the final maneuver point on the maneuver list (block 336). If it is determined that the current maneuver point is the final maneuver point, then the server may transmit the maneuver list to the vehicle client (block 338). If it is determined that it is not the final maneuver point, then the next maneuver point on the maneuver list may be analyzed (block 345). If the bearing angle does exceed the angular threshold, then the second shape point may be eliminated (block 335). The elimination of shape points may be performed under a technique known as "smoothing" that allows for the elimination of a data point if values adjacent to the data points are known. Estimates may be determined by using these adjacent values and graphically interpolating the value of a third data point.

Once the second shape point has been eliminated the next consecutive shape point between the first and second maneuver point may be selected for analysis (block 340). Steps shown in block 320 through block 340 may be repeated until all of the shape points between the first and a second maneuver point have been selected and analyzed.

Figure 4:
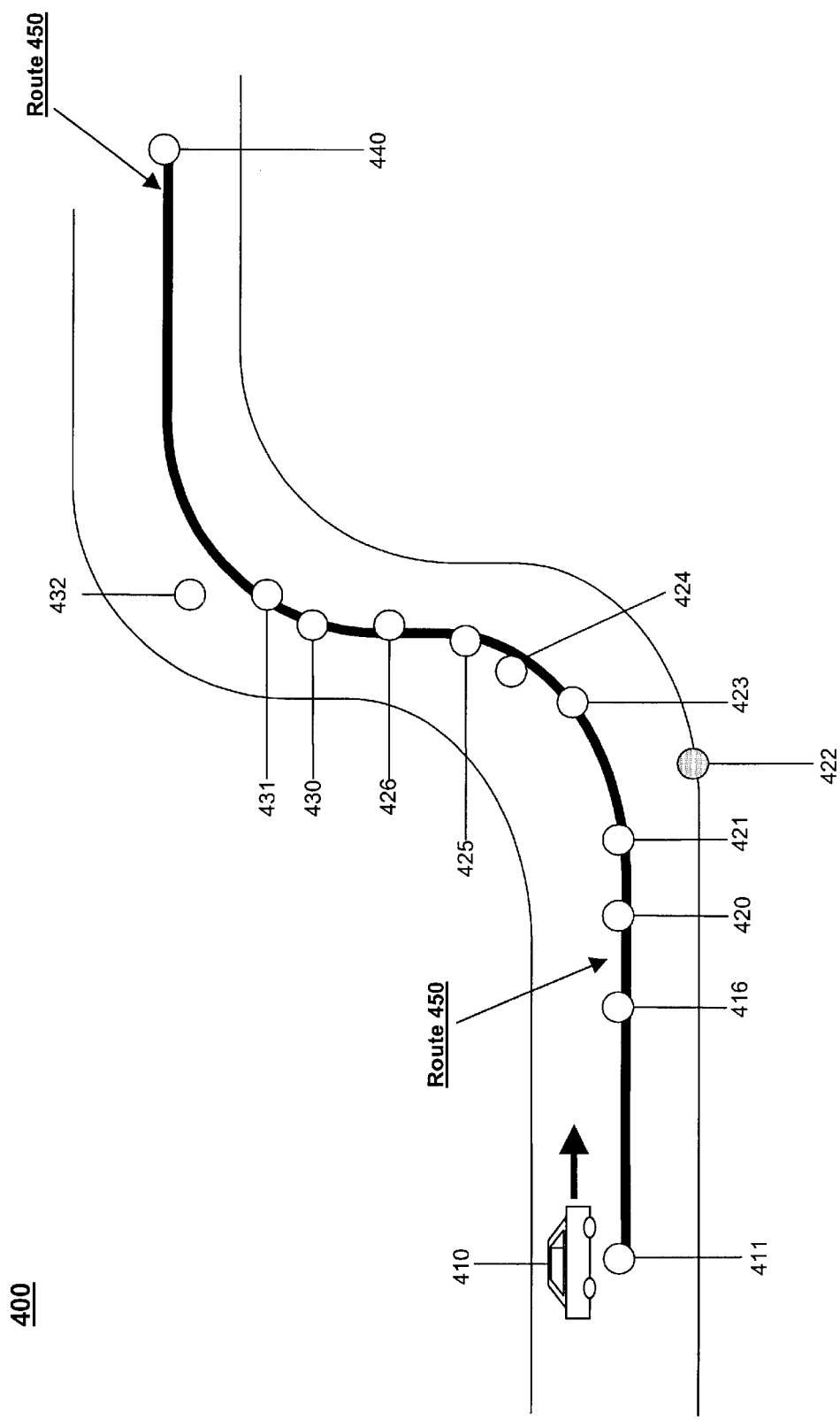
FIG. 4 is a sequence diagram of one embodiment of a method for reducing shape points for generating navigation information for a vehicle in accordance with the present invention.

FIG. 4 is a sequence diagram, illustrating an example of one embodiment of a method for reducing shape points for generating navigation information for a vehicle in accordance with the present invention at 400.

Points 411, 420, 425, 430 and 440 indicate maneuver points of client vehicle on route 450. Maneuver point 411 may be the starting location of the vehicle client 410. Maneuver points 420, 425, and 430 may be intermediate locations of the vehicle client 410 on route 450 and, maneuver point 440 may be the final location of the vehicle client 410 on route 450.

As vehicle client 410 travels from maneuver point 411 to maneuver point 420 the vehicle client 410 accesses the maneuver list and crosses one shape point 416. For the purpose of illustration, the cardinal threshold in this example is 2. Because the number of shape points between maneuver point 411 and maneuver point 420 does not exceed the cardinal threshold, the next pair of consecutive maneuver points (420, 425) is analyzed. There are four shape points (421, 422, 423 and 424) between maneuver point 420 and maneuver point 425. Because this exceeds the cardinal threshold, the first two consecutive shape points (421, 422) are selected for analysis. The great circle distance and angular bearing for the selected shape points may be calculated by a technique known in the art. For illustration in this example, the angular bearing is assumed to exceed the angular threshold and therefore the second shape point 422 may be eliminated. When the navigation information is transmitted to the application server, the geographic profile of the path from maneuver point 420 to maneuver point 425 may be calculated without consideration of shape point 422. The next shape point 423 may be selected for analysis. For illustration in this example, the angular threshold is not exceeded and therefore shape point 423 will be retained. When the navigation information is transmitted to the application server, the geographic profile of the path from maneuver point 420 to maneuver point 425 may be calculated with consideration of shape point 423. The next shape point 424 may be selected for analysis. For illustration in this example, the angular threshold is not exceeded and therefore shape point 424 will be retained. When the navigation information is transmitted to the application server, the geographic profile of the path from maneuver point 420 to maneuver point 425 may be calculated with consideration of shape point 424. The next pair of consecutive maneuver points (425, 430) may be analyzed. There is only one shape point (426) between maneuver point 425 and maneuver point 430. Because this does not exceed the cardinal threshold, the next pair of consecutive maneuver points (430 and ending maneuver point 440) can be analyzed. Shape points 431 and 432 are the only two shape points between maneuver point 430 and ending maneuver point 440, therefore the cardinal threshold has not been exceeded and both shape points (431, 432) may be retained. When the navigation information is transmitted to the application server, the geographic profile of the path from maneuver point 430 to maneuver point 440 may be calculated with consideration of shape point 431 and shape point 432.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of determining navigation instructions for a vehicle, comprising:

determining a number of shape points between a set of primary maneuver points for navigating a vehicle;

determining whether the number of shape points exceeds a cardinal threshold;

determining a bearing between a first shape point and a second shape point, if it is determined that the number of shape points exceeds the cardinal threshold;

determining whether the bearing exceeds an angular threshold; and eliminating the second shape point if it is determined that the bearing exceeds the angular threshold.

2. The method of claim 1, further comprising:

eliminating remaining second shape points within consecutive pairs of shape points between primary maneuver points, if associated bearings exceed the angular threshold.

3. The method of claim 1, further comprising:

determining a bearing between a third shape point and one of the first shape point and the second shape point.

4. The method of claim 3, further comprising:

eliminating the third shape point if the second bearing exceeds the angular threshold.

5. The method of claim 1, wherein the set of primary maneuver points is one of a plurality of sets of primary maneuver points in the navigation route.

6. The method of claim 1, wherein the anglular threshold value is predetermined.

7. The method of claim 1, wherein the cardinal threshold is predetermined.

8. A computer usable medium including a program for determining instructions for a vehicle, comprising:

computer readable program code that determines a number of shape points between a set of primary maneuver points for navigating a vehicle;

computer readable program code that determines whether the number of shape points exceeds a cardinal threshold;

computer readable program code that determines a bearing between a first shape point and a second shape point, if it is determined that the number of shape points exceeds the cardinal threshold;

computer readable program code that determines whether the bearing exceeds an angular threshold; and computer readable program code that eliminates the second shape point, if it is determined that the bearing exceeds the angular threshold.

9. The computer usable medium of claim 8, further comprising:

computer readable program code that eliminates remaining second shape points within consecutive pairs of shape points between primary maneuver points, if associated bearings exceed the angular threshold.

10. The computer usable medium of claim 8, further comprising:

computer readable program code that determines a bearing between a third shape point and one of the first shape point and the second shape point.

11. The computer usable medium of claim 10, further comprising:

computer readable program code that eliminates the third shape point, if the second bearing exceeds the angular threshold.

12. The computer usable medium of claim 8, wherein the set of primary maneuver points is one of a plurality of sets of primary maneuver points in the navigation route.

13. The computer usable medium of claim 8, wherein the cardinal threshold value is predetermined.

14. The computer usable medium of claim 8, wherein the angular threshold value is predetermined.

15. A system for determining navigation instructions for a vehicle, comprising:

means for determining a number of shape points between a set of primary maneuver points for navigating a vehicle;

means for determining whether the number of shape points exceeds a cardinal threshold;

means for determining a bearing between a first shape point and a second shape point, if it is determined that the number of shape points exceeds the cardinal threshold;

means for determining whether the bearing exceeds an angular threshold; and means for eliminating the second shape point if it is determined that the bearing exceeds the angular threshold.

16. The system of claim 15, further comprising:

means for eliminating remaining second shape points within consecutive pairs of shape points between primary maneuver points if associated bearings exceed the angular threshold.

17. The system of claim 15, further comprising:

means for determining a bearing between a third shape point and one of the first shape point and a second shape point.

18. The system of claim 17, further comprising:

means for eliminating the third shape point if the second bearing exceeds the angular threshold.

* * * * *